B. F. AUGUSTINE.
ROTARY ENGINE.
APPLICATION FILED DEC. 17, 1908.

1,006,896.

Patented Oct. 24, 1911.
5 SHEETS—SHEET 1.

WITNESSES:
Leon J. Marquis
Joseph H. Loebel

INVENTOR
BENJAMIN F. AUGUSTINE
BY
W. T. Miller
ATTORNEY

B. F. AUGUSTINE.
ROTARY ENGINE.
APPLICATION FILED DEC. 17, 1908.
1,006,896.
Patented Oct. 24, 1911.
5 SHEETS—SHEET 2.
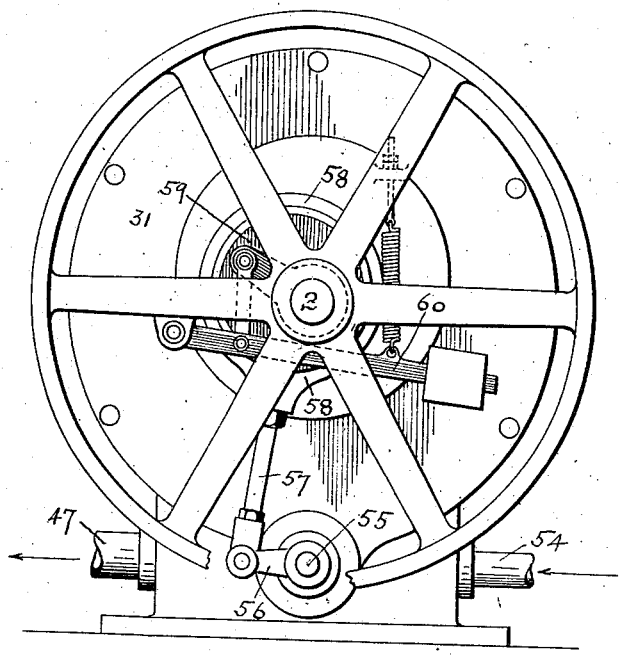
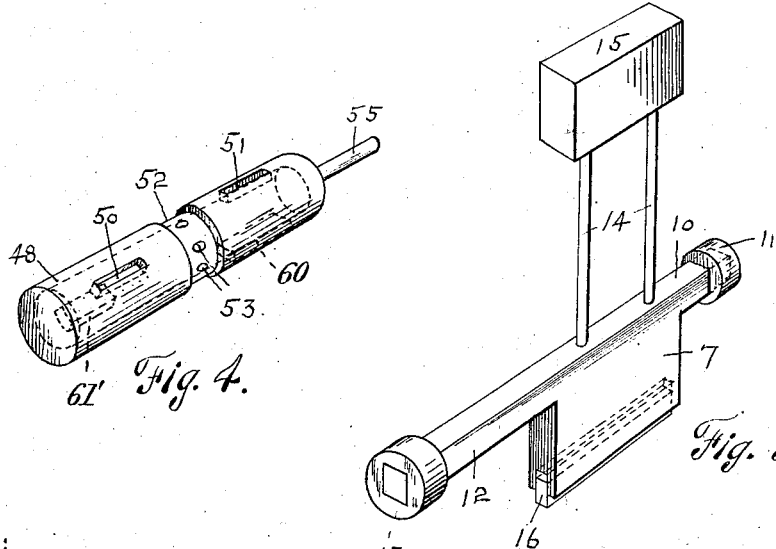
WITNESSES:
Leon J. Marquis
Joseph H. Loebel
INVENTOR
BENJAMIN F. AUGUSTINE
BY
W. T. Miller
ATTORNEY

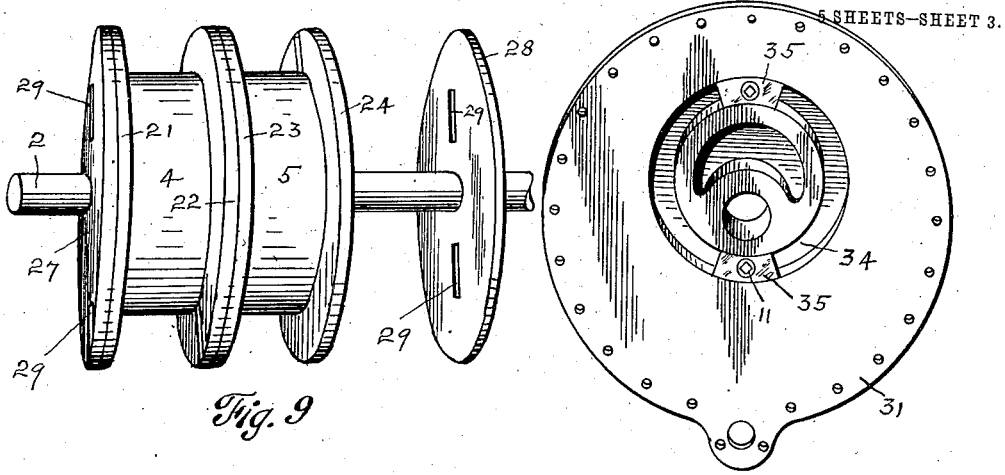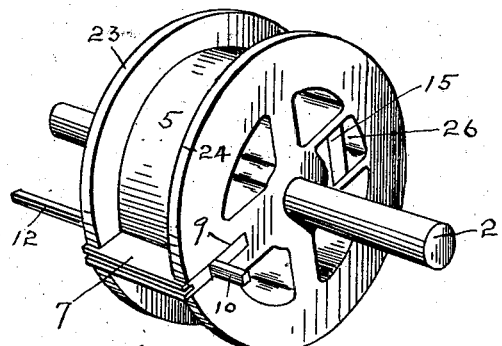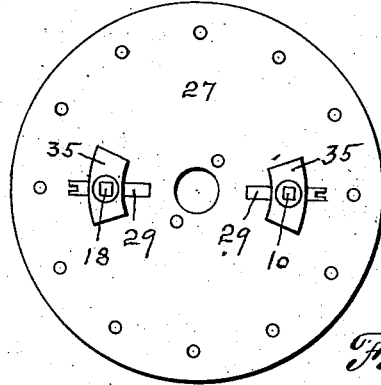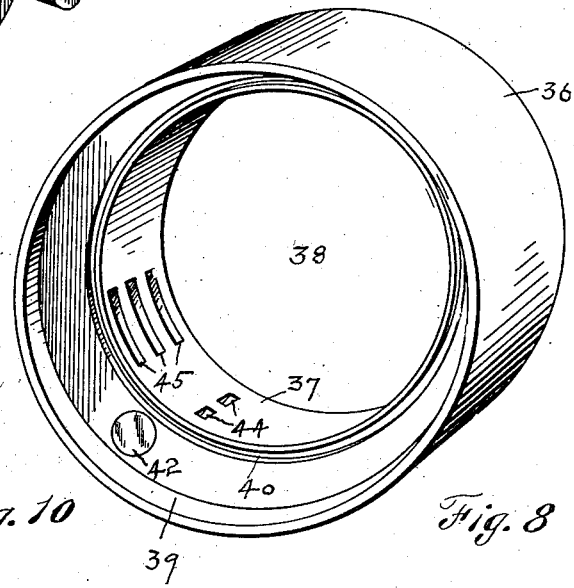

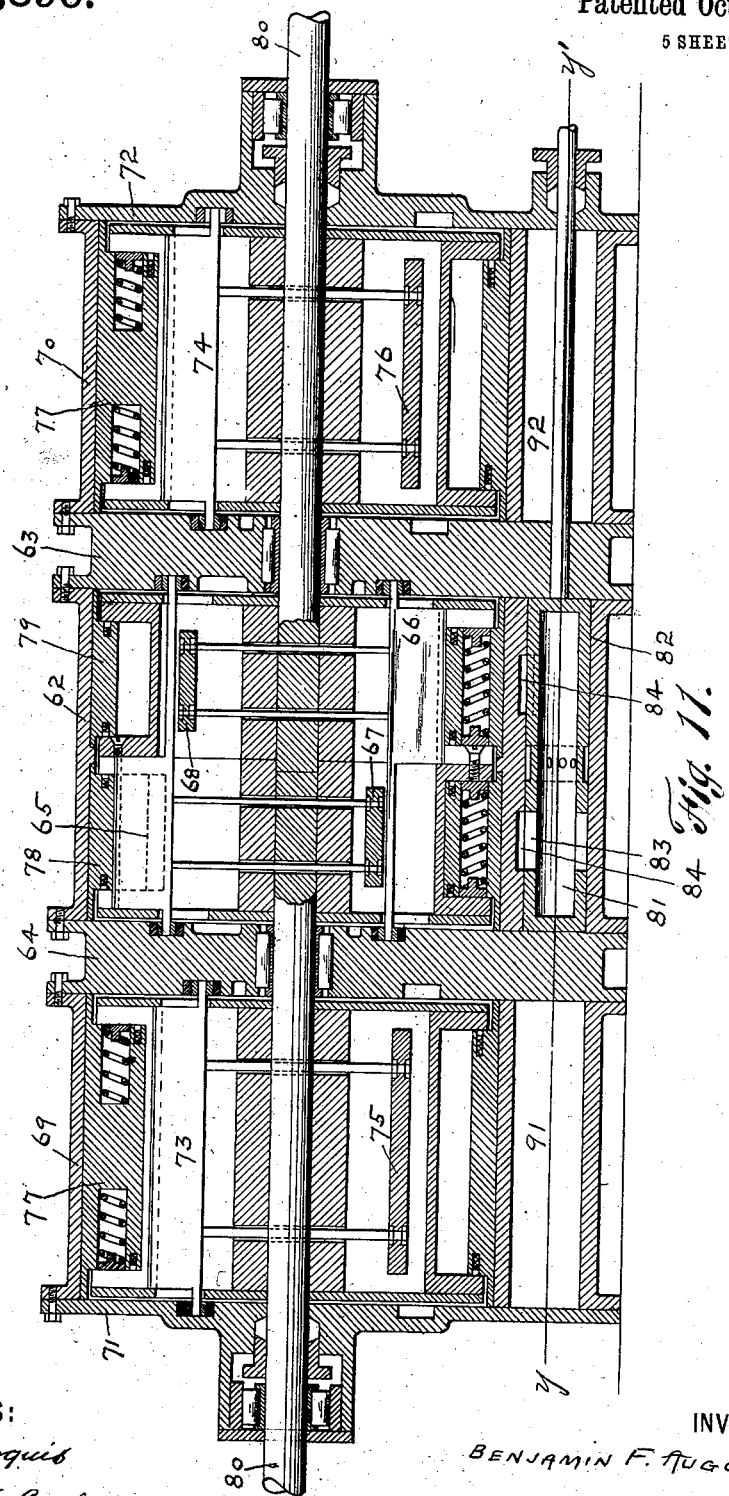

B. F. AUGUSTINE.
ROTARY ENGINE.
APPLICATION FILED DEC. 17, 1908.

1,006,896.

Patented Oct. 24, 1911.

5 SHEETS—SHEET 5.

WITNESSES:
Leon J. Marquis.
Joseph H. Lockel

INVENTOR
BENJAMIN F. AUGUSTINE

BY
W. F. Miller
ATTORNEY

UNITED STATES PATENT OFFICE.

BENJAMIN F. AUGUSTINE, OF BUFFALO, NEW YORK.

ROTARY ENGINE.

1,006,896.   Specification of Letters Patent.   Patented Oct. 24, 1911.

Application filed December 17, 1908. Serial No. 468,059.

*To all whom it may concern:*

Be it known that I, BENJAMIN F. AUGUSTINE, a citizen of the United States, residing at Buffalo, in the county of Erie and State of New York, have invented certain new and useful Improvements in Rotary Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in rotary engines and more particularly to that type embodied in Letters Patent No. 873,201, granted to me December 10th, 1907. Such type includes, in common with my present invention, the following distinguishing features, viz: the counterbalanced pistons provided with steam-locked joints, the revolving central core with radial pockets in which the pistons reciprocate, and the removable abutment-piece.

With the above features as a foundation I propose, in my present invention, to arrange and combine therewith certain novel elements, for the production of increased efficiency and economy of operation.

The principal objects of my present invention are, first, to materially increase the efficiency of expansion of the fluid. Second, to automatically balance the valve of the valve mechanism to regulate the supply of fluid to the pistons for variations in the load; and, third, to utilize the expansion of the exhaust fluid.

Figure 1:
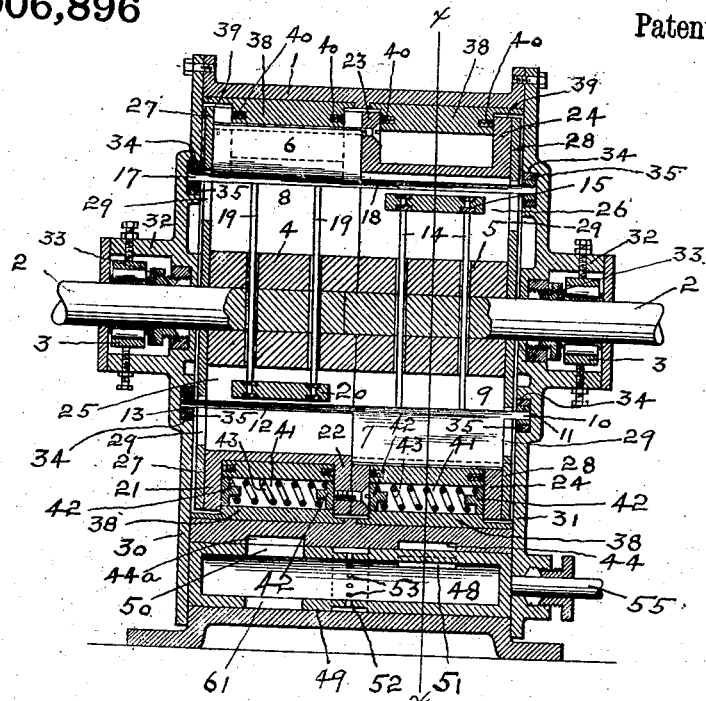
Figure 2:
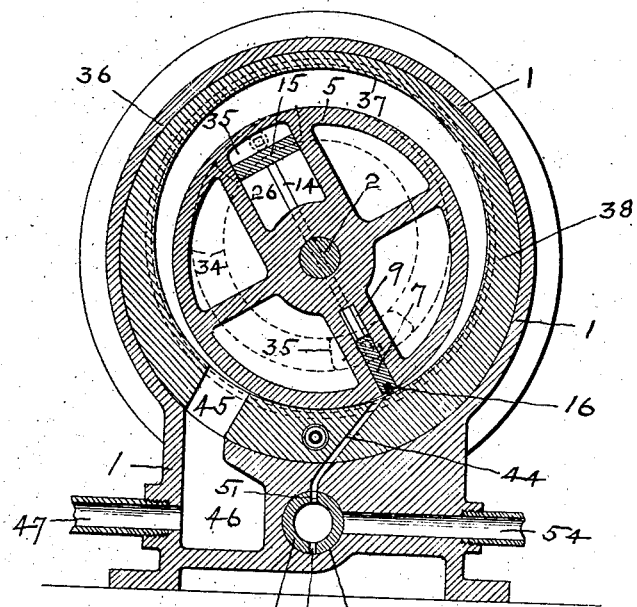
Figure 12:
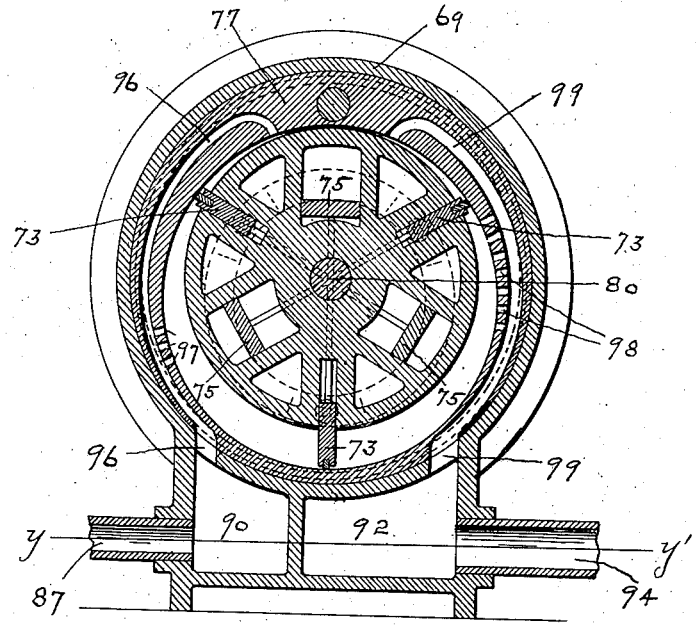
Figure 13:
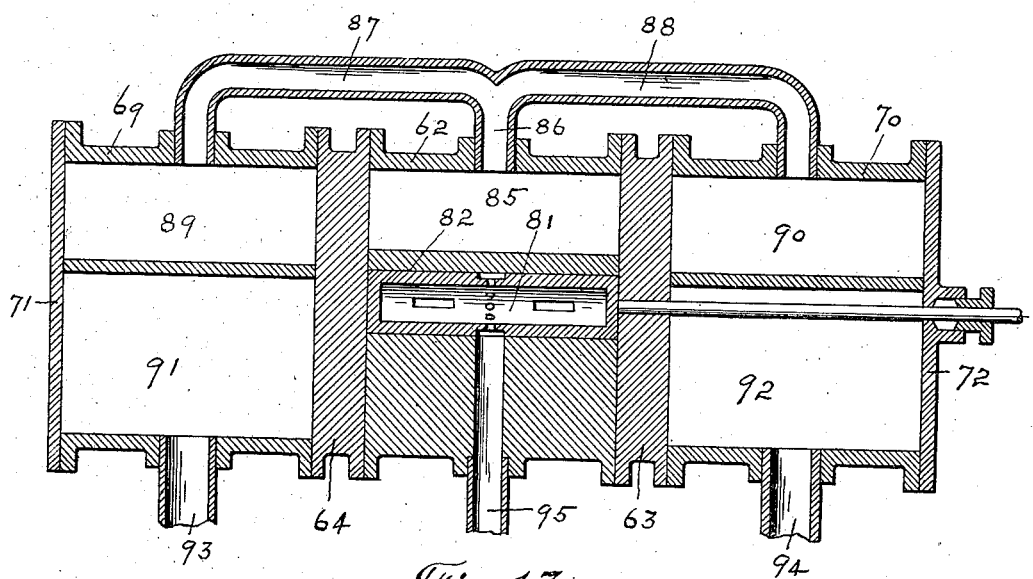

To these ends my invention consists of certain novel details of construction, all of which will be fully hereinafter described and claimed. In the drawings Figure 1 is a central vertical longitudinal section of my improved engine. Fig. 2 is a vertical transverse section taken in the line *x—x* of Fig. 1. Fig. 3 is an end elevation showing the application of the centrifugal governor. Fig. 4 is a detached perspective view of the balanced valve. Fig. 5 is a detached perspective view of one of the counterbalanced pistons. Fig. 6 is a detached view of the inside face of one of the cylinder-heads. Fig. 7 is a detached perspective view of one of the revolving central cores with its single piston in position. Fig. 8 is a detached perspective view of one of the removable abutment-pieces. Fig. 9 is a detached perspective of the complete sectional revolving central core. Fig. 10 shows the outer face of one of the outer disks of the central core. Fig. 11 is a central vertical longitudinal section of the compound engine. Fig. 12 is a vertical transverse section of one of the end cylinders in the compound type shown in Fig. 11; and, Fig. 13 is a sectional view of the valve system and adjacent parts, taken in the line *y—y'* of Figs. 11 and 13.

Referring to the drawings, 1 represents the stationary cylinder or casing; 2 is the power shaft which passes through the casing and is journaled in suitable adjustable roller bearings 3, 3, on the opposite ends of the casing. The rotary piston carrier or core is composed of the two separate sections 4 and 5, which are fixed to the shaft to turn therewith and are arranged in the casing to contact on one side thereof, whereby are provided two separate abutments to act against in driving the engine.

The separate sections 4 and 5 of the core are provided with the single pistons 6 and 7 arranged in radial piston pockets 8 and 9, in which the pistons reciprocate as the core sections rotate.

Referring particularly to Fig. 5, the piston 7 is provided on one side with the short arm 10 carrying on its outer end the removable bushing 11, and 12 is the long arm on the opposite side of the piston 7, also carrying on its outer end the removable bushing 13. Two cylinder rods 14—14 extend outwardly from the piston 7 and carry at their outer ends the counterweight 15, and 16 is a removable packing bar in outer end of the piston 7. The other piston (see Fig. 1) is similarly provided with the short arm 17, the long arm 18, the rods 19, and the counterweight 20.

The sectional core 4 has the outer annular flanges 21 and 22 and the sectional core 5 has similar outer annular flanges 23 and 24. The outer annular flanges 21 and 24 are removable from their respective cores for the purpose hereinafter explained. The sectional cores 4 and 5 are provided with the interior radial chambers 25 and 26 for the snug sliding reception of the counterweights 15 and 20 on the pistons 7 and 6 respectively. The cylindrical rods 14 and 19 joining the counterweights 15 and 20 to their respective pistons, pass loosely through the sectional cores 4 and 5 and the common shaft 2, as clearly shown in Fig. 1; 27 and 28 are outer disks keyed to shaft 2 and bolted to the cores 4 and 5. These disks 27 and 28 form outer end walls for the radial piston pockets 8 and 9 and the radial chambers 25 and 26. Radial slots 29 in the disks 27 and 28 are provided to permit of the passage therethrough of the arms 10 and 12 and 17 and 18 on the pistons 6 and 7, as clearly shown in Fig. 1.

30 and 31 are the cylinder heads bolted to each end of the cylinder 1.

Centrally arranged on the outer face of each of the cylinder heads 30 and 31 are the journals 32 carrying the stuffing boxes 33 and the adjustable roller-bearings 3. On the inner faces of the cylinder heads 30 and 31 are the circular channels 34 adapted for the sliding reception of the cross-heads 35, secured to the outer ends of the long and short arms of the pistons 6 and 7, as clearly shown in Fig. 1.

My improved abutment 38 has the outer cylindrical wall 36 in close contact with the inner cylindrical wall of the cylinder 1. The inner cylindrical wall 37 of the abutment 38 is eccentric with the sectional cores 4 and 5 and the shaft 2, as clearly shown in Fig. 2. On each side of the abutment 38 is the annular flange 39, forming an annular recess for the reception of flange 24 on the core 5 and the disk 28 (see Fig. 1). Spring-pressed metal packing-rings 40 are interposed between the side walls of the abutments and the side walls on the flanges of the sectional cores, as clearly shown in Fig. 1.

Within the thicker side of each abutment is a transverse cylindrical chamber 41, in each end of which is a packing-block 42, with interposed spiral spring 43 for pressing the packing-blocks 42 against the inner surfaces of the flanges on the sectional cores. Extending through the abutments are the inlet-ports 44 and the exhaust-ports 45. Communicating with the exhaust-ports 45 is the common exhaust-chamber 46 having the exhaust-pipe 47 leading therefrom.

48 is the hollow cylindrical valve adapted to be revolved within its chamber 49. It is provided with the outlet-ports 50, 51, out of line with each other sufficiently to overlap inlet-ports 44 when the valve is centered. The center portion of the valve 48 is cut away at 52 to form with the surrounding chamber 49 an annular chamber into which the expansive fluid passes through the perforations 53 to effect a proper balance of the valve. The perforations 53 extend entirely around the cut-away portion 52 of the valve 48. This permits the uniform distribution of the expansive fluid entirely around the valve and thereby prevents any possible binding of the valve against the wall of its chamber.

54 is the inlet-passage for conducting the fluid to the interior of the valve 48.

55 is the valve-stem rigid with the valve and projecting out through the cores 31 of the cylinder 1. At the outer end of this valve-stem 55 is keyed one end of the rocker-arm 56 (see Fig. 3), its other end being pivoted to the lower end of the connecting-rod 57, the upper end of which rigidly joins the eccentric strap 58 surrounding the cam 59, forming a part of the centrifugal governor 60, shown in Fig. 3, which may be of any well-known type.

My improved rotary engine just described operates as follows: The operating fluid (either steam or gas) enters through passage 54 to the central cylindrical chamber of the valve 48, and passing through perforation 53, enters the interior of the valve 48 ready for operative action. When the piston 7 passes inlet-port 44, the outlet-port 51 in valve 48 commences to register with port 44 and is cut off automatically by the action of the centrifugal governor 60, the degree of registration of port 44 with port 51, from full to partial, being automatically regulated through governor 60, by the varying load. The instant that piston 7 completes the first half of its stroke the piston 6 in the adjacent rotary piston carrier 4 crosses inlet-port 44ᵃ (see Fig. 1) and at the next instant outlet-port 50 in the valve 48 commences to register with inlet port 44ᵃ and is cut off automatically in the same manner as heretofore described in connection with ports 44 and 51. This successive action of the two pistons effects a greatly increased expansion of the operating fluid, for the reason that there is practically no clearance, and there being absolutely no compression owing to the exhaust being constantly open (see Fig. 2) the fullest amount of expansion is made possible. By means of adjustable roller-bearings 3, 3, the revolving piston carriers 4 and 5 can be brought to a tight operative contact with the lower portion of the inner wall 37 of the abutment 38, without interrupting the continuous travel of the pistons 6 and 7 upon the wall 37 of the abutment 38. The long and short arms on the pistons 6 and 7 being in unyielding engagement with the cross-heads 35, 35, which travel in their respective circular channels 34, 34 serve to keep the shoes 16 of the pistons at all times in operative contact with the abutment wall 37 and the counterweights 15 and 20, by reason of their centrifugal force, keep the shoes 16 on the pistons from wearing pressure on the inner contacting wall 37 of the abutment. With this construction the piston carrier can be shifted by means of their adjustable bearings without increasing the frictional contact of the piston shoes with the inner contacting walls of the abutments.

61 (see Figs. 1 and 2) is an opening in the wall of the cylindrical valve diametrically opposite the outlet-port 51 and slightly larger than such port. This opening 61 is for the purpose of effecting a steam-tight joint between the upper wall of the valve 48 and the contacting wall of its chamber, around the point of junction of port 51 with the lower end of the inlet-port 44. The area of the opening 61 is to be gaged, with respect to the area of the opposite outlet-port 51, according to the fluid pressure, to effect and maintain a proper balance of the valve. A similar opening (not shown) is supplied opposite the outlet-valve 50 for the same purpose.

In Figs. 11, 12 and 13 I have shown a compound form of the engine, known as the multiple-stage type, consisting of a battery of three cylinders, the central cylinder being identical with the type just described in detail, and the cylinders on each side of the central cylinder being of the general type covered by my former Patent 873,201 hereinbefore mentioned. Referring to Fig. 11, the central engine embodies a cylinder 62, the head 63 common to the central and right-hand engines, the head 64 common to the central and left-hand engines, the pistons 65 and 66, with their counterweights 67 and 68 and their long and short arms which engage with their respective crossheads moving in their circular channels to reciprocate the pistons in their pockets, in the manner already fully described. The right and left-hand engines as shown in Fig. 11 are identical in construction and position of parts. In such engines 69 and 70 are the cylinders, 71 and 72 the outer cylinder-heads, 73 and 74 one of the pistons, with their respective counterweights 75 and 76. The pistons in each of the outer cylinders are three in number, arranged as shown in Fig. 12, and the abutments 77 in such outer engines have their thicker portions above, while the abutments 78 and 79 in the central engine have their thicker portions below, as shown in Fig. 11. The three engines have the common shaft 80. The valve for controlling the operating fluid is located in the central engine and consists of the hollow cylinder 81 in its chamber 82. This valve has the usual outlet-ports 83, registering with the inlet-ports 84 of the cylinder 62. Referring to Fig. 13, the exhaust chamber of the central cylinder is seen at 85, just behind the valve 81. Leading out of this exhaust chamber 85 is the receiver, consisting of the passage 86 having the two branches 87 and 88, which communicate respectively with the receiving chambers 89 and 90 of the end cylinders 69 and 70. In front of these receiving chambers 89 and 90 are the exhaust chambers 91 and 92 having the exhaust outlet-pipes 93 and 94.

The operation of my improved compound engine just outlined is as follows: The operating fluid (either steam or gas) is fed in through pipe 95 to the interior chamber 81 of the valve, from which it passes through outlet-ports 83 of the valve, and through the registering inlet ports 84, 84, into the central cylinder, where its expansive action serves to revolve the piston carrier by means of its reciprocating pistons, as has been fully hereinbefore described in connection with the engine shown in Figs. 1 and 2. The expansive fluid exhausts into the chamber 85 and thence through the passage 86, where it divides into the branch passages 87 and 88 and is conducted through such passages into the separate receiving chambers 89 and 90 of the cylinders 69 and 70. The expansive force remaining in the fluid at this point is exerted to operate the two outer engines as will now be further explained. Referring particularly to Fig. 12, the fluid issuing from the receiver 90 passes through the chamber 96 in the abutment 77. The bulk of the expansive fluid passes through openings 97 into the open space behind the lower piston 73, exerting a forward impulse against the same. That portion of the channel 96 which extends beyond the openings 97 is for the purpose of equalizing the pressure on the succeeding piston. When the lower piston 73 passes the openings 98, the fluid behind such piston exhausts through such openings into the channel 99 and from thence to and into the exhaust chamber 92 and out of the exhaust pipe 94. That portion of the channel 99 which extends beyond the openings 98 is for the purpose of equalizing the pressure on the preceding piston 73.

It will be seen from an inspection of Fig. 11, that the two separate abutments of the central engine have contact with their piston carriers at the lowest points of the inner walls of the abutments, while in the outer engines the contact of the abutment in each engine with its piston carrier is at the highest point of the inner wall of such abutment. The relative positions of the parts just described serve to effect a perfect balance of all of the revolving piston carriers, which are rigid upon the common shaft 80.

I claim—

1. In a rotary engine, having separate piston carriers with single pistons, the combination with the cylinder heads provided with the circular channels and the crossheads traveling in such channels, of the reciprocating pistons and the long and short arms on such pistons journaled in the crossheads, as and for the purpose stated.

2. In a rotary engine, a casing, a power shaft journaled in the casing, a plurality of revolving piston carriers secured to the power shaft, cylinder heads secured to the casing and provided with channels, a reciprocating piston mounted in each piston carrier and each provided with a short and a long arm adapted to project into the channels of said cylinder heads, cross heads removably secured to the free ends of said arms and adapted to travel in said channels, and means for conveying the operative fluid to the pistons.

3. In a rotary engine, a casing, a power shaft journaled in the casing, a plurality of revolving piston carriers secured to the power shaft, each carrier including a core portion and oppositely disposed flanges, disks keyed to said shaft and bolted to said cores, the disks each having oppositely disposed slots, cylinder heads secured to the casing and provided with channels, a reciprocating piston mounted in each piston carrier radially thereof and bridging the space between the core thereof and the periphery of the core flanges when assuming one position, each piston having a short and a long arm adapted to project through the slots of said disks and into said channels of the cylinder heads, cross heads secured to the free ends of said arms and adapted to travel in said channels, and means for conveying the operative fluid to the pistons.

4. In a rotary engine, a casing, a power shaft journaled in the casing, a plurality of revolving piston carriers secured to the piston shaft, each carrier including a core portion and oppositely disposed flanges, disks keyed to said shaft and bolted to said cores, the disks each having oppositely disposed slots, cylinder heads secured to the casing and provided with channels, a reciprocating piston mounted in each piston carrier radially thereof and bridging the space between the core thereof and the periphery of the core flanges when assuming one position, each piston having a short and a long arm adapted to project through the slots of said disks and into said channels of the cylinder heads, cross heads secured to the free ends of said arms and adapted to travel in said channels, the short and long arms of one piston being disposed respectively opposite to the short and long arms of the other piston, and means for conveying the operative fluid to the pistons.

5. In a rotary engine, a casing, a power shaft journaled in the casing, a plurality of revolving piston carriers secured to the power shaft, each carrier including a central body portion and spaced flanges, the body portion and flanges being provided with radial slots forming pockets, a reciprocating piston mounted in the pocket of each carrier and provided with a short and a long arm, cylinder heads secured to the casing and provided with circular channels, the longer arm of each piston operating in the channel of the opposite cylinder head and the shorter arm of each piston operating in the channel of the opposite cylinder head, means for counterbalancing each piston, and means for supplying the operative fluid to the pistons.

6. In a rotary engine, a casing, a power shaft journaled in the casing, a plurality of revolving piston carriers secured to the power shaft, each carrier including a core, a chamber and a pocket, a piston in each pocket, a weight in each chamber having connection with the corresponding piston to balance the latter, a disk secured to each carrier to form the outer wall of the corresponding chambers and pockets, each disk having slots, cylinder heads adjacent the disks, each having a channel, a cross head operable in each channel, the pistons each having a short and a long arm which project through the corresponding slots of said disks and secured to the corresponding cross heads with the longer arm of one piston projecting in the opposite direction to the longer arm of the other piston, the longer arm of each piston projecting through said heads, and means for supplying the operating fluid to the pistons.

7. In a rotary engine, a casing, a power shaft journaled in the casing, a plurality of revolving piston carriers secured to the power shaft, each carrier including a core, a chamber and a pocket, a piston in each pocket, a weight in each chamber having connection with the corresponding piston to balance the latter, a disk secured to each carrier to form the outer wall of the corresponding chambers and pockets, each disk having slots, cylinder heads adjacent the disks, each having a channel, the pistons each having arms which project through the corresponding slots of said disks and which are secured to the corresponding cylinder heads, and means for supplying the operating fluid to the pistons.

In testimony whereof, I have signed my name to this specification, in the presence of two subscribing witnesses.

BENJAMIN F. AUGUSTINE.

Witnesses:
C. V. BOUGHTON,
JOHN FRANEY.